United States Patent [19]

Vicik

[11] Patent Number: 4,851,290
[45] Date of Patent: Jul. 25, 1989

[54] MULTILAYER THERMOPLASTIC FILM

[75] Inventor: Stephen J. Vicik, Darien, Ill.

[73] Assignee: Viskase Corporation, Chicago, Ill.

[21] Appl. No.: 141,228

[22] Filed: Jan. 6, 1988

[51] Int. Cl.$^4$ .............................................. B32B 27/08
[52] U.S. Cl. ................................. 428/334; 428/475.5; 428/475.8; 428/522; 428/349
[58] Field of Search .................. 428/475.8, 475.5, 522, 428/336, 349, 334

[56] References Cited

U.S. PATENT DOCUMENTS

| | | | |
|---|---|---|---|
| 3,955,040 | 5/1976 | Schirimer | 428/475.8 |
| 4,104,404 | 8/1978 | Bieler et al. | 428/35 |
| 4,407,873 | 10/1983 | Christensen et al. | 428/475.5 |
| 4,452,942 | 6/1987 | Shida et al. | 525/74 |
| 4,481,262 | 11/1984 | Shida et al. | 428/441 |
| 4,537,836 | 8/1985 | Adur et al. | 428/522 |
| 4,556,590 | 12/1985 | Martin | 428/35 |
| 4,557,780 | 12/1985 | Newsome et al. | 428/475.8 |
| 4,683,170 | 7/1987 | Tse et al. | 428/349 |
| 4,686,125 | 8/1987 | Johnston et al. | 428/475.8 |
| 4,729,926 | 3/1988 | Koteles et al. | 428/475.8 |
| 4,735,855 | 4/1988 | Wofford et al. | 428/475.8 |

*Primary Examiner*—Edith Buffalow
*Attorney, Agent, or Firm*—John C. LeFever

[57] ABSTRACT

An irradiated three layer thermoplastic film for holding hot-filled foods during the succeeding cold water tumble-chilling and further refrigerating steps, comprising a nylon 6.12 or nylon 6.66 core layer, and outer layers comprising a blend of 50–75% polyethylene or EVA, and 25–50% polyethylene-modified adhesive or EVA-modified adhesive.

17 Claims, No Drawings

MULTILAYER THERMOPLASTIC FILM

FIELD OF THE INVENTION

This invention relates to a multilayer thermoplastic film with a barrier layer, suitable for use in manufacturing bags for holding hot-filled foods during the succeeding cold water tumblechilling, further refrigerating and storing steps.

BACKGROUND OF THE INVENTION

One system wherein food is stored over a wide temperature range in a multilayer thermoplastic film-type casing under conditions of substantial physical abuse and impact is the Capkold System marketed by the Groen Division of the Dover Corporation. Capkold is designed as a food preparation, storage and distribution system for food service operations as for example in restaurant chains, hospitals and schools.

In the Capkold System, large quantities of food as for example meat and poultry products are cooked at temperatures of at least 180° F. (82° C.) and then pumped at this temperature into the casing. The processed food-containing casing package is closed, as for example by clipping or heat sealing, and tumble-cooked to about 40° F. (4° C.) in a cold-water bath. Next the partially cooled food product package is transferred to a refrigeration zone for further cooling to 28°–32° F. (−2° to 0° C.) and normally stored for a sustained period which can be up to 45 days. During this refrigerated storage period the food package may for example be transferred from a central processing location to a number of food consumption sites at remote locations. When needed, the refrigerated (but not frozen) product packages may be reheated to the desired dispensing temperature as for example 120° F. (49° C.), the casing is opened and the contents emptied therefrom. The empty casing is discarded. Alternatively, the refrigerated product is transferred from the casing to another container for reheating.

There are a number of specific requirements for multilayer film useful as the Capkold casing material. It must include a core layer which provides an oxygen transmission rate below about 90 cc/M$^2$/24 hrs./atm. through the entire multilayer film. This is necessary to avoid spoilage of the enclosed food due to oxygen passage from the environment through the film wall. This requirement must be satisfied over the entire temperature range from hot filling at temperatures of at least about 180° F. (82° C.) to the refrigeration temperature of about 28° F. (−2° C.).

Another requirement is that the film must remain perfectly intact, ie. without any delamination between the core layer and both the inner and outer layers over the entire temperature range.

A further requirement is that the inner layer must have abuse resistance to withstand rigors of shipping and handling. Also, the inner layer must be completely chemically inert and nonreactive with the processed food over the temperature range of at least about 180° F. to about 28° F.

A still further requirement is that the outermost layer, generally termed the abuse layer, must be cross-linkable, withstand damage from dropping, and resist puncture resulting from impact during the tumble-cooling. Finally, the overall film must provide adequate tensile strength.

The prior art has employed multilayer films with at least five layers to satisfy these requirements of the Capkold System. For example, one such film broadly described in U.S. Pat. No. 4,104,404 to Bieler et al is marketed by W. R. Grace's Cryovac Division under the designation C300, and comprises an irradiated five layer film of polyethylene/adhesive/nylon/adhesive/polyethylene. One reason for the adhesive layers is that the presently used nylon core layer and the polyethylene outer layers do not bond well by direct adhesion.

According to the Bieler et al Patent, it is necessary to irradiate the five layer films at a relatively high dosage of at least 6 Mrad to provide the needed abuse resistance and delamination resistance.

It will be apparent from the foregoing that the presently used Capkold System films are complex both in terms of multiple materials and sophisticated manufacturing techniques, and expensive to manufacture.

An object of the present invention is to provide an improved multilayer thermoplastic film suitable for use in the Capkold System, which has less than five layers.

Another object is to provide a three layer film meeting all of the functional requirements for the Capkold System.

Still another object is to provide a three layer film with a nylon-type oxygen barrier core layer and outstanding adhesion properties with the outer layers over a wide temperature range between at least about 180° F. and about 28° F.

A further object is to provide a nylon core-type three layer film which not only has the aforedescribed outstanding adhesion properties but also affords good resistance to the physical abuse from cold water tumbling of a food package employing this film.

An additional object is to provide a nylon core-type three layer film which has all of the aforementioned properties without the need for a relatively high irradiation dosage on the order of 6 Mrad.

Other objects and advantages of this invention will be apparent from the ensuing disclosure and appended claims.

SUMMARY OF THE INVENTION

It has been unexpectedly discovered that all of the aforementioned film requirements for the Capkold System are satisfied by a three layer film comprising particular types of nylon as the core layer, and blends of particular thermoplastic compounds in defined ranges as the inner and outer layers.

More specifically, the three layer thermoplastic film of this invention is irradiated and includes a core layer comprising a member selected from the group consisting of nylon 6,12 and nylon 6,66, and first and second outer layers directly adhered to opposite sides of the core layer. Each of these outer layers comprises a blend of between about 50% and about 75% by weight of a first member which is cross-linked and selected from the group consisting of polyethylene and ethylene vinyl acetate having above about 100° C. melting point, and between about 25% and about 50% by weight of a second member which is cross-linked, chemically reacted with the selected nylon core layer, and is itself selected from the group consisting of a polyethylene-modified adhesive and an ethylene vinyl acetate-modified adhesive. The film is irradiated at a level of at least about 2 Mrad.

As will be demonstrated hereinafter, this film is relatively easy to manufacture, provides low oxygen transmission, is not delaminated under hot filling, tumble-cooling, further cooling and refrigeration storage conditions, and withstands the physical abuse of tumble-cooling. These performance characteristics are achieved with a three layer film irradiated at average dose substantially below 6 Mrad. Accordingly, it is functionally equivalent to the more complicated five layer prior art film commonly used in the Capkold System.

DETAILED DESCRIPTION

The multilayer film of this invention is preferably manufactured in tubular form by simultaneous co-extrusion of the three layers using the conventional blown bubble technique. Then the bubble is collapsed. After cooling, the tube is flattened and irradiated at dosage of at least about 2 Mrad.

The multilayer film is wound up as flattened, seamless, tubular film to be used later to make bags i.e., casings closed at both ends. The bags may be formed by clipping at least one of the open tube ends. The bags are used by placing the food product in the bag and sealing the open portion as by clipping or heat sealing. If used in the Capkold System, the food product is hot filled and thereafter tumble-cooled and further refrigerated. If the food is uncooked, the food-containing bag is then immersed in a hot liquid bath typically about 150° to 190° F. for cooking, then cooled and further refrigerated.

The first outer layer of this multilayer film is directly adhered to one side of the core layer, and in direct contact with the outer surface of the stored food product. This layer is primarily responsible for processability of this film. The thickness of the first outer layer is preferably between about 1 and 2 mils. Thinner layers may not perform the aforedescribed function while thicker layers do not appreciably improve processability of the film.

The second outer layer of this film is directly adhered to the outer side of the core layer (opposite to the first outer layer). This layer is in direct contact with the environment including the cold water during cooling. Also, it must withstand contact with sharp objects so is termed the abuse layer and provides abrasion resistance. The second outer layer thickness is preferably between about 1 and 2 mils. Thinner layers may be less effective in performing the abuse resistance protection, while thicker layers may not improve performance in this respect.

For reasons explained hereinafter, the core layer must comprise either nylon 6,12 or nylon 6,66, or a mixture thereof. The core layer is sufficiently thick to maintain the oxygen transmission rate through the entire multilayer film below about 90 cc/24 hrs./atm. This is necessary to avoid spoilage of the food enclosed in the multilayer film due to oxygen passage from the environment through the film wall. The core layer thickness is preferably up to about 2 mils to perform its intended function for the food storage. Thicker core layers are not needed to satisfy the oxygen transmission rate requirement. The core layer is most preferably between about 1 and 2 mils thick to perform its intended function and provide maximum flexibility.

The thickness of the aforedescribed three layer film is preferably between about 3 and 6 mils. Lower thicknesses reduce the effectiveness of at least one of the three layers to perform the aforedescribed functions, while higher thicknesses reduce the film flexibility and do not appreciably improve its performance. In a preferred balance of the foregoing considerations, the thickness of the core layer is between about 1.3 and about 1.7 mils, the thicknesses of each of the first and second outer layers is between about 1.3 and 1.7 mils and the total thickness of the multilayer film is between about 4 and about 5 mils.

The first and second outer layers are directly adhered to opposite sides of the core layer. They need not be identical, but each comprises a blend of between about 50% and about 75% by weight of a first member and between about 25% and about 50% by weight of a second member.

The first member material to be used in the film manufacture must be cross-linkable when exposed to ionizing radiation, thereby providing improved abuse resistance at elevated temperatures and possibly some improvement in interlayer adhesion. The first member may be one or more polyethylenes, as for example the well-known low, medium or high density types, but preferably is either the linear low density (LLDPE) or the very low density (VLDPE or ULDPE) type. These polyethylenes all have melting points above about 100° C. The first member may also be an ethylene vinyl acetate having above about 100° C. melting point. The reason for this latter requirement is that the melting point should be substantially above the highest temperature of the hot filled food, i.e., about 90° C. to avoid softening, distortion and loss of strength. Another reason for this melting point lower limit is to minimize the moisture vapor transmission rate for the EVA copolymer.

To be useful as the second member of the first and second outer layers, a polyethylene-modified or ethylene vinyl acetate modified adhesive must be cross-linkable when exposed to ionizing radiation and chemically reactive with the selected nylon core layer to form a delamination resistant bond with the nylon. Suitable adhesives are typically acid or acid anhydride modified polymers.

The first and second layer blends must comprise at least about 50% by weight of the first member to retain the high "toughness" or abuse-resistance characteristic of the selected first member. That is, the second member (the adhesive component) has lower abuse resistance than the polyethylene or EVA first member. On the other hand, the first member should not comprise more than about 75% by weight of the first and second layer blends because there must be sufficient proportion of the second member to provide the needed adhesion to the selected nylon core layer. For the opposite reasons, the second member should comprise between about 25% and about 50% by weight of the first and second outer layers.

In a preferred balance of these aforedescribed properties, the blend or blends of the first and second layers comprises between about 55% and 65% of the first member and between about 35% and 45% of the second member. In the most preferred balance, the blend of the first and second layers comprises about 60% of the first member and about 40% of the second member, all on a weight basis.

In general, various conventional additives such as slip agents and pigments can be incorporated in the film in accordance with conventional practice.

While this invention is specifically described in terms of three layers, it should be understood that one or more additional layers may be directly adhered to the outside of either the first outer layer or the second outer layer, but not between these layers and the core layer. By way of example, for even higher abuse resistance polypropylene may be added as a fourth layer to the first outer layer.

The multiple layer film of this invention is irradiated at a level of at least about 2 Mrad to increase its layer adhesion strength and abuse resistance. As used herein, this means that at least one outer layer (the second outer layer in contact with the environment) is irradiated at this level. Lower irradiation levels do not provide improved strength and higher levels than about 5 Mrad do not further improve performance. A preferred balance is between about 3 and 5 Mrad.

As used herein, "irradiation" and "irradiated" means exposure to high energy radiation such as electrons, X-rays, gamma rays, beta rays and the like, which induce cross-linking between the molecules of the irradiated material. Preferably, irradiation is carried out by an electron accelerator and the dosage level is determined by standard dosimetry methods. The dosage is measured in "rads" wherein one rad is the absorbed dose of ionizing radiation equal to an energy of 100 ergs per gram of irradiation material. A megarad (Mrad) is one million rads.

In the following examples, the materials used are those identified and described in Table A (Nylons), Table B (Adhesive Resins) and Table C (Thermoplastics).

TABLE A

Nylons

| Designation | Composition | Manufacturers (Product Designation) |
| --- | --- | --- |
| Nylon 6 | Polycaproamide 215° C. MP Medium Molecular Wt. | Allied Chemical (8207F) |
| Nylon 6 | Polycaproamide 215° C. MP High Molecular Wt. | Allied Chemical (8209F) |
| Nylon 6 | Modified Nylon 6 For Improved Adhesion | Allied Chemical (Extrabond 100F) |
| Nylon 6,12 | Copolymer of caprolactam and laurolactam 195° C. MP | Emser Industries (CR9) |
| Nylon 6,66 | Copolymer of Nylon 6 and Nylon 66 | Allied Chemical (1539) |
| Amorphous Nylon | Nylon 6I/6T (CAS Reg. No. 25750-23-6) | DuPont Company (Selar) |

TABLE B

Adhesive Resins

| Commercial Designation | Composition | Manufacturer |
| --- | --- | --- |
| Admer NF500 | Modified LLDPE resin 1.8 melt index, 90° C. Vicat softening point | Mitsui Ltd. |

TABLE B-continued

Adhesive Resins

| Commercial Designation | Composition | Manufacturer |
| --- | --- | --- |
| CXA E162 | EVA based polymer containing anhydride functionality, 0.8 melt index, 60° C. Vicat softening point | DuPont Company |
| Plexar 105 | Modified 9% VA resin 1.0 melt index, 90° C. Vicat softening point | USI Chemicals |
| Plexar 281 | Modified LLDPE resin 1.8 melt index, 127° C. melting point | USI Chemicals |

TABLE C

Thermoplastics

| Type | Manufacturer |
| --- | --- |
| Ethylene vinyl acetate Copolymer (EVA) - 4.5% vinyl acetate (VA), 0.25 melt index, | USI Chemicals (resin 480) |
| EVA (1.5% VA, 0.30 melt index) | Exxon Corporation (LD 141) |
| Polyethylene resin, 0.921 density, 0.35 melt index | Exxon Corporation (LD 142) |
| Linear low density polyethylene (LLDPE) (Octene copolymer) 0.920 density, 1.0 melt index | Dow Chemical (Dowlex 2045) |
| Linear low density polyethylene (LLDPE) (Butene copolymer) 0.92 density, 0.7 melt index | Union Carbide Corporation (resin GRSN 7510) |

EXAMPLE I

A series of three layer films were prepared in tubular form by blown film extrusion, the films having different types of nylon core layers but identical butene copolymer-type linear low density polyethylene (UCC 7510) outer layers. With one exception, each type film had the same overall thickness of 4.5 mils, comprising outer layers each of 1.7 mils thickness and a 1 mil thick core layer. Sample 2 was about 9.5 mils thick, comprising outer layers each of about 3.75 mils thickness and a 2 mil thick core layer. The nylons were selected because of their relatively high melting points, toughness and oxygen barrier properties needed for cook-in film usage. After manufacture, the tubular films of 8 inches flat width were irradiated with an electron accelerator from one side at about 3 Mrad, clipped at one end to form bags and tested for durability. The actual irradiation dosage for samples 1 and 3-5 was about 3 Mrad at the surface, at 4.5 mils depth—2.7 Mrad, and at 9.0 mils depth the effective dosage was 1.5 Mrad.

For the durability test the bags were filled with hot chilli and dropped from a height of 8 feet. For the adhesion tests the bags were evaluated visually. Three (3) bags were tested for each sample film and their relative performance was ranked, based on visual examination. The results of these performances rankings are summarized in Table D.

TABLE D

Drop Test - Adhesion Qualitative Comparison Performance Ranking

| Sample | Composition | Drop Test | Adhesion |
| --- | --- | --- | --- |
| 1 | LLDPE/Nylon 6,66/LLDPE | 1 (No failures, small blister one sample) | 2 (Some delamination) |
| 2 | LLDPE/Nylon 6/LLDPE | 1 | 3 |

TABLE D-continued

Drop Test - Adhesion Qualitative Comparison Performance Ranking

| Sample | Composition | Drop Test | Adhesion |
|---|---|---|---|
| | | (No failures, but very heavy gauge*) | (Noticeable delamination) |
| 3 | LLDPE/Nylon 6,12/LLDPE | 2 (One leaker) | 1 (Very slight delamination) |
| 4 | LLDPE/Nylon 6 High MW/LLDPE | 3 (Broke) | 2 (Some delamination) |
| 5 | LLDPE/Amorphous Nylon/LLDPE | 4 (Broke severly) | 4 (Complete delamination) |

*9.5 mils thickness instead of 4.5 mils

Table D shows that in terms of abuse resistance the films varied greatly—from the very poorly performing sample 5 (amorphous nylon core) to the best performing samples 1 (nylon 6,66 core layer) and sample 2 (nylon 6 core layer heavy gauge). Sample 3 (nylon 6, 12 core layer) was also considered promising as there was only one leaker. With respect to adhesion, there was also a wide difference between the samples, ranging from complete delamination for sample 5 (amorphous nylon core layer) to only very slight delamination for sample 3 (nylon 6,12 core layer). However for Capkold System applications, no delamination can be tolerated.

The film must remain perfectly laminated through the entire temperature range of refrigerated food product therein at about 28° F. to sustained exposure to hot food at the cooking temperature of at least about 180° F. Accordingly, from the standpoint of film adhesion alone, none of the film samples in Table D would be suitable for cook-in applications.

EXAMPLE II

Another series of tests were conducted to qualitatively rate adhesion between two types of nylon films (nylon 6/12 of the 90/10 type and a blend of 80% nylon 6–20% nylon 6/12 of the 60/40 type) as one layer, and certain ethylene vinyl acetate—adhesion compound blends in the film form as another layer. The two types of film were separately extruded and combined as layers in a platen press under controlled conditions to form two layer films which were not irradiated. The nylon layers were about 0.7 mils thick and the EVA-adhesive blend layer was about 2 mils thick, so that two-layer films were used in the adhesion tests. The samples were "T" shaped with one end section of the layers bonded together and with the opposite end section comprising unbonded tabs. The procedure to test adhesion was qualitative, and the report was the average of three observations. The test procedure was to try to separate the bonded section by hand pulling the two tabs apart. The results were qualitatively compared on the following Table E basis and summarized in Table F.

TABLE E

Qualitative Delamination Tendency

| Observed Tendency For Delamination | Qualitative Rating |
|---|---|
| Very difficult to separate. | Very good |
| Complete adhesion but films separable with hard pulling. | Good |
| Some areas not adhered; separable with moderate pulling. Very little adhesion and very easily separable. | Fair |
| | Poor |

TABLE F

Nylon Adhesion

| | | Nylon 6/12 (90/10) | | 80% Nylon 6/20% Nylon 6/12 (60/40) |
|---|---|---|---|---|
| Sample | Thermoplastic Layer | 240° F. | 270° F. | 240° F. |
| 6 | 80% EVA (4.5% VA)/ 20% Admer NF 500 | Fair | Very Good | None |
| 7 | 80% EVA (4.5% VA)/ 20% CXA E162 | Fair | Very Good | Fair |
| 8 | 80% EVA (4.5% VA)/ 20% Plexar 281 | Good | Very Good | Fair |
| 9 | 80% EVA (4.5% VA)/ 20% Plexar 105 | Good | Very Good | None |
| 10 | 80% EVA (1.5% VA)/ 20% Plexar 105 | Poor | Very Good | Poor |
| 11 | 80% EVA (1.5% VA)/ 20% Admer NF 500 | Poor | Very Good | Poor |
| 12 | 80% EVA (1.5% VA)/ 20% CXA E162 | None | Poor | Poor |
| 13 | 80% EVA (1.5% VA)/ 20% Plexar 281 | None | Poor | Poor |

It will be noted from Table F that adhesion was measured at two temperatures, 240° F. and 270° F. This was because the adhesive in the outer layers reacts with the nylon core layer at elevated temperatures to provide an adhering bond therebetween. The heating, reacting and bonding occurs during extrusion of the multilayer film if manufactured by coextrusion. If the film is to be prepared by coating extrusion, the substrate layer may be preheated and the extruded material is applied hot so that reacting-bonding takes place during the coating step.

For certain of the Table F samples (nos. 8 and 9) it appears that with the nylon 6/12 core layer this reaction-bonding process was nearly completed at 240° F. and was completed at 270° F. For the nylon 6/12 samples 10 and 11, the reaction-bonding process did not start at 240° F. but was completed at 270° F. For the nylon 6/12 samples 12 and 13, there was only poor adhesion even at 270° F. In general, it is preferred to have good adhesion at a relatively lower temperature so from this standpoint, samples 8 and 9 are preferred. It should be noted in this regard that the adhesive of sample 8 is LLDPE based (Plexar 281) whereas the sample 9 adhesive is EVA based (Plexar 105). Plexar 281 is the preferred adhesive because it demonstrated fair adhesion with the nylon 6—nylon 6/12 blend core layer (sample 8) whereas Plexar 105 provided no adhesion with this nylon blend core layer.

EXAMPLE III

Still another series of 3 Mrad one side and 3 Mrad two sides post-irradiated three layer films were prepared to demonstrate puncture resistance properties. The manufacturing method was blown film coextrusion and each of the layers was 1.5 mils thick, so that the total film thickness was 4.5 mils. Because of the favorable adhesion performance of Plexar 281 in sample 8 of Example II, this LLDPE-based adhesive was used in both the outer layers to prepare all of the samples in this Example III. However, because of the poor adhesive performance of Plexar 281 in the 20 wt.% blend with 1.5% vinyl acetate type EVA (sample 13) in Example II, 40% Plexar 281 was used in Example III. The other constituent of the outer layers was either an EVA (1.5% VA or 4.5% VA) or LLDPE. A variety of nylons were used as the core layer; each is used in the manufacture of films for meat packaging applications.

The films were prepared in tubular form of 8 inches flat width and then irradiated using an electron accelerator. For the 3 Mrad one side irradiated samples, measurements indicated that the dosage was as follows: at surface—3 Mrads at 4.5 mils depth—2.7 Mrad, and at 9.0 mils depth the effective dosage was 1.5 Mrad. For the 3 Mrad two side irradiation the electron beam was first applied at 3 Mrad from one side and then applied at 3 Mrad from the opposite side. The measured penetration from the side of the second dosage was as follows: at surface 4.5 Mrad, at 4.5 mils depth 5.4 Mrad and at 9.0 mils depth 4.5 Mrad. The average dose was significantly less than 6 Mrad.

The dynamic puncture-impact test procedure was used to compare films for their resistance to bone puncture. It measured the energy required to puncture a test sample with a sharp triangular metal point made to simulate a sharp bone end. A Dynamic Ball Burst Tester, Model No. 13-8, available from Testing Machines, Inc., Amityville, Long Island, NY, was used and a ⅜ inch diameter triangular tip installed on the tester probe arm and employed in this test procedure. Six test specimens approximately 4 inches square were prepared. A specimen was placed in the sample holder, and the pendulum was released. The puncture energy reading was recorded. The results were calculated in cm-kg per mil of film thickness.

The puncture propagated tear test (hereinafter referred to as "PPT") was performed using a Model No. 83 manufactured by Testing Machines Inc. Amityville, New York. The general procedure involved the penetration of a film by a sharp edge assembly and measuring the length of the cut. It should be noted that for purpose of comparison, relatively high dynamic puncture values are desirable whereas relatively low PPT values are desirable. The results of these tests are summarized in Table G.

TABLE G

| | Compositions | | Puncture Properties | | | |
|---|---|---|---|---|---|---|
| | | | 3 Mrad One Side | | 3 Mrad Two Sides | |
| Sample | Inner and Outer Layers | Core Layer | Dynamic Puncture | PPT | Dynamic Puncture | PPT |
| 14 | 60% EVA (4.5% VA) 40% Plexar 281 | Nylon 6,66 | 5.8 | 5.5 | 6.4 | 8.6 |
| 15 | 60% EVA (1.5% VA) 40% Plexar 281 | Nylon 6,66 | 7.6 | 3.4 | 7.3 | 7.9 |
| 16 | 60% EVA (4.5% VA) 40% Plexar 281 | Nylon 6,12 | 5.4 | 4.0 | 6.8 | 3.4 |
| 17 | 60% EVA (1.5% VA) 40% Plexar 281 | Nylon 6,12 | 5.2 | 6.7 | 6.3 | 6.4 |
| 18 | 60% EVA (4.5% VA) 40% Plexar 281 | Nylon 6- High MW | 4.6 | 10.6 | 4.6 | 9.3 |
| 19 | 60% EVA (1.5% VA) 40% Plexar 281 | Nylon 6- Med. MW | 4.3 | 10.8 | 5.1 | 10.5 |
| 20 | 60% EVA (4.5% VA) 40% Plexar 281 | Nylon Xtrabond | 5.3 | 9.4 | 5.1 | 11.1 |
| 21 | 60% LLDPE 40% Plexar 281 | Nylon 6,66 | 5.0 | 5.1 | 6.7 | 10.2 |
| 22 | 60% LLDPE 40% Plexar 281 | Nylon 6- Med. MW | 5.3 | 9.4 | 4.7 | 10.3 |
| 23 | 60% LLDPE 40% Plexar 281 | Nylon Xtrabond | 4.5 | 9.9 | 4.8 | 10.4 |
| 24 | 100% Plexar 281 | Nylon Xtrabond | 5.1 | 11.2 | 4.3 | 11.5 |
| 25 | PE/Adh/Nylon/Adh/PE (Cryovac C-300) | Nylon (Type unknown) | — | — | 8.1* | 8.7* |

*Irradiation assumed to provide 6 Mrad penetration through entire film (U.S. Pat. No. 4,104,404).

In Table G it will be recognized that samples 14, 15 and 21 (nylon 6,66 core layer) and samples 16 and 17 (nylon 6,12 core layer) are embodiments of the invention. Their dynamic puncture and PPT performance is substantially superior to samples 18, 19 and 22 (nylon 6 medium molecular weight) and samples 20, 23 and 24 (nylon Xtrabond). Also, the performance of the three layer invention embodiments is substantially equivalent at two sided 3 Mrad irradiation to that of the commercially employed Cryovac C-300 five layer film (sample 25).

Referring now more specifically to Table G, the best performer was sample 15 which provided the highest dynamic puncture values and the lowest PPT values at both one side 3 Mrad and two side 3 Mrad irradiation. For these reasons, nylon 6,66 is the most preferred core layer in the film of this invention. For the same reason the most preferred first member in the blend of the outer layers is ethylene vinyl acetate having a vinyl acetate content of about 1.5 wt.%. Similarly, the most preferred second member in the blend of the outer layers is a LLDPE-based adhesive and the most preferred blend is about 60% ethylene vinyl acetate having about 1.5% vinyl acetate content, and about 40% of a LLDPE-based adhesive.

The next best performer based on relatively high dynamic puncture values and relatively low PPT values at both one side 3 Mrad and two side 3 Mrad irradiation was sample 16. The only difference between samples 15 and 16 was the vinyl acetate content of the EVA in the blends comprising the outer layers.

It was surprising that the nylon 6,66 and nylon 6,12 core layer samples provided substantially higher dynamic puncture values and substantially lower PPT values than the other nylon type core layer samples, with the same blends in both outer layers. For example, nylon 6 is widely used in meat packaging. Along with the high molecular weight resin 8209, the medium molecular weight resin 8207 and Extrabond 100F are all promoted by the manufacturer as providing superior strength characteristics. Yet these recommended nylons were shown to be substantially more puncture prone than nylon 6,66 and nylon 6,12 core layer films. On this basis, it appears that these particular two nylons are unique in their ability to provide puncture-resistant properties in the three layer thermoplastic films of this invention.

EXAMPLE IV

In this test, three of the Example III samples (nos. 15 and 21 as invention embodiments and 25 as the control) irradiated to one side 3 Mrad and two side 3 Mrad were used in a Capkold-type hot fill and tumble-chilling sequence to simulate commercial operation.

The films were in the form of 8 inch flat width, 28 inch long casing clipped at one end. Two such films of each sample type were charged one-half full with 180° F. chili and clip closed. The food packages were then loaded into a comercial type tumbler (Roschermatic Model No. MM-150) containing an ice slurry, and tumbled for a total of 12 hours.

All food packages survived hot filling and 12 hours of tumble chilling without damage. This test demonstrates that the three layer film of this invention irradiated at average doses substantially below 6 Mrad are functionally equivalent to the commercially used five layer prior art film irradiated at a level of at least 6 Mrad.

Although the film of this invention has been specifically described for use in the Capkold System, it may be used to package other perishables in a hermetically sealed atmosphere where protection against oxygen transmission is needed, as for example processed or frozen meats.

While the preferred embodiments of the invention have been disclosed hereinabove, those skilled in the art will appreciate that changes and modifications may be made therein without departing from the spirit and scope of the invention.

What is claimed is:

1. A three layer thermoplastic film comprising:
   (a) a core layer comprising a member selected from the group of nylon 6,12 and nylon 6,66; and
   (b) first and second outer layers directly adhered to opposite sides of said core layer each comprising a blend of between about 50% and about 75% by weight of a first member which is cross-linked and selected from the group consisting of polyethylene and ethylene vinyl acetate having above about 100° C. melting point, and between about 25% and about 50% by weight of a second member which is cross-linked, chemically reacted with said core layer and selected from the group consisting of a polyethylene-modified adhesive and an ethylene vinyl acetate-modified adhesive;
   (c) said film having been irradiated at a level of at least about 2 Mrad.

2. A plastic film according to claim 1 wherein the core layer comprises nylon 6,66.

3. A plastic film according to claim 1 wherein said first member is linear low density polyethylene.

4. A plastic film according to claim 1 wherein said first member is very low density polyethylene.

5. A plastic film according to claim 1 wherein said first member is ethylene vinyl acetate.

6. A plastic film according to claim 5 wherein the vinyl acetate content of said ethylene vinyl acetate is between about 1 and about 5 wt.%.

7. A plastic film according to claim 6 wherein the vinyl acetate content of said ethylene vinyl acetate is about 1.5 wt.%.

8. A plastic film according to claim 1 wherein said second member is a linear low density polyethylene-based adhesive.

9. A plastic film according to claim 1 wherein said blend of said first and second layers comprises between about 55% and 65% of said first member, and between about 35% and 45% of said second member.

10. A plastic film according to claim 9 wherein said blend comprises about 60% of said first member and about 40% of said second member.

11. A plastic film according to claim 1 wherein said first outer layer is ethylene vinyl acetate and said second outer layer is a linear low density polyethylene-based adhesive.

12. A plastic film according to claim 11 wherein said ethylene vinyl acetate has vinyl acetate content of about 1.5 wt.%.

13. A plastic film according to claim 11 wherein the core layer comprises nylon 6,66.

14. A plastic film according to claim 1 wherein the thickness of said core layer is between about 1 and about 2 mils.

15. A plastic film according to claim 1 wherein the thicknesses of each of said first and second outer layers is between about 1 and about 2 mils.

16. A plastic film according to claim 1 wherein the thickness of said core layer is between about 1.3 and about 1.7 mils, the thicknesses of each of said first and second outer layers is between about 1.3 and about 1.7 mils, and the thickness of said film is between about 4 and about 5 mils.

17. A plastic film according to claim 1 wherein the film has been irradiated at dosages of between about 3 and about 5 Mrad.

* * * * *